（12）United States Patent
Gaugler (10) Patent No.: US 11,329,334 B2
(45) Date of Patent: *May 10, 2022

(54) BUTTON CELL HAVING WINDING ELECTRODE AND METHOD FOR THE PRODUCTION THEREOF

(71) Applicant: VARTA Microbattery GmbH, Ellwangen (DE)

(72) Inventor: Winfried Gaugler, Ellwangen (DE)

(73) Assignee: VARTA MICROBATTERY GMBH, Ellwangen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,940

(22) Filed: Sep. 3, 2021

(65) Prior Publication Data

US 2021/0399370 A1  Dec. 23, 2021

Related U.S. Application Data

(62) Division of application No. 17/238,329, filed on Apr. 23, 2021, now Pat. No. 11,158,896, which is a
(Continued)

(30) Foreign Application Priority Data

Jun. 18, 2009 (DE) .................. 10 2009 030 359.6
Dec. 31, 2009 (DE) .................. 10 2009 060 800.1

(51) Int. Cl.
*H01M 50/109* (2021.01)
*H01M 10/04* (2006.01)
(Continued)

(52) U.S. Cl.
CPC ..... *H01M 50/109* (2021.01); *H01M 10/0427* (2013.01); *H01M 10/0436* (2013.01);
(Continued)

(58) Field of Classification Search
CPC ......... H01M 10/0525; H01M 10/0587; H01M 50/166; H01M 50/171; H01M 50/109;
(Continued)

(56) References Cited

U.S. PATENT DOCUMENTS 3,069,489 A   12/1962   Carmichael et al.
3,748,182 A    7/1973   Brown
(Continued)

FOREIGN PATENT DOCUMENTS

CN    1184338 A    6/1998
CN    1224934 A    8/1999
(Continued)

OTHER PUBLICATIONS

Zhang, Guoshun et al. "Application of Auto Laser Welding in Rechargeable Battery Manufacturing," Chinese Journal of Lasers, vol. 35, No. 11, Nov. 2008.
(Continued)

*Primary Examiner* — Jonathan G Jelsma
*Assistant Examiner* — Omar M Kekia
(74) *Attorney, Agent, or Firm* — Leydig, Voit & Mayer, Ltd.

(57) ABSTRACT

A button cell configured as a secondary lithium ion battery includes a button cell housing and an electrode separator assembly disposed inside the button cell housing. The button cell housing includes a metal cell cup, the metal cell cup having a cell cup plane region connected to a cell cup lateral surface region, a metal cell top, the metal cell top having a cell top plane region connected to a cell top lateral surface region, and an electrically insulating seal disposed between the cell cup lateral surface region and the cell top lateral surface region. The electrode separator assembly includes a positive electrode formed from a first portion of a first current collector, a negative electrode formed from a first
(Continued)

portion of a second current collector, and a separator disposed between the positive electrode and the negative electrode.

25 Claims, 5 Drawing Sheets

Related U.S. Application Data division of application No. 17/173,222, filed on Feb. 11, 2021, now Pat. No. 11,024,907, which is a division of application No. 15/699,435, filed on Sep. 8, 2017, now Pat. No. 11,024,904, which is a division of application No. 13/378,117, filed as application No. PCT/EP2010/058637 on Jun. 18, 2010, now Pat. No. 9,799,858.

(51) Int. Cl.
    *H01M 10/0587*     (2010.01)
    *H01M 50/56*     (2021.01)
    *H01M 50/166*     (2021.01)
    *H01M 50/171*     (2021.01)
    *H01M 50/172*     (2021.01)
    *H01M 50/538*     (2021.01)
    *H01M 10/0525*     (2010.01)

(52) U.S. Cl.
CPC ..... *H01M 10/0587* (2013.01); *H01M 50/166* (2021.01); *H01M 50/171* (2021.01); *H01M 50/172* (2021.01); *H01M 50/538* (2021.01); *H01M 50/56* (2021.01); *H01M 10/0525* (2013.01); *Y02E 60/10* (2013.01); *Y10T 29/4911* (2015.01)

(58) Field of Classification Search
CPC ............. H01M 50/56; H01M 10/0427; H01M 50/172; H01M 50/538; H01M 10/0436; Y10T 29/4911; Y02E 60/10
USPC .......................................................... 429/94
See application file for complete search history.

(56) References Cited

U.S. PATENT DOCUMENTS

| | | |
|---|---|---|
| 3,827,916 A | 8/1974 | Fagan, Jr. |
| 3,960,599 A | 6/1976 | Reynier et al. |
| 4,053,687 A | 10/1977 | Coibion et al. |
| 4,091,181 A | 5/1978 | Merritt, Jr. |
| 4,220,695 A | 9/1980 | Ishida et al. |
| 4,224,387 A | 9/1980 | Nakayama |
| 4,262,064 A | 4/1981 | Nagle |
| 4,321,316 A | 3/1982 | Kuehl |
| 4,487,819 A | 12/1984 | Koga |
| 4,520,085 A | 5/1985 | Wyser |
| 4,539,271 A | 9/1985 | Crabtree |
| 4,554,226 A | 11/1985 | Simonton |
| 4,664,989 A | 5/1987 | Johnson |
| 4,927,719 A | 5/1990 | Ashihara et al. |
| 5,128,219 A | 7/1992 | Kohler et al. |
| 5,273,842 A | 12/1993 | Yamahira et al. |
| 5,356,736 A | 10/1994 | Kita et al. |
| 5,378,560 A | 1/1995 | Tomiyama |
| 5,432,027 A | 7/1995 | Tuttle et al. |
| 5,470,357 A | 11/1995 | Schmutz et al. |
| 5,567,538 A | 10/1996 | Oltman et al. |
| 5,603,737 A | 2/1997 | Marincic et al. |
| 5,626,988 A | 5/1997 | Daniel-Ivad et al. |
| 5,631,104 A | 5/1997 | Zhong et al. |
| 5,639,569 A | 6/1997 | Köhler et al. |
| 5,654,114 A | 8/1997 | Kubota et al. |
| 5,698,340 A | 12/1997 | Xue et al. |
| 5,792,574 A | 8/1998 | Mitate et al. |
| 5,912,091 A | 6/1999 | Daio et al. |
| 6,042,625 A | 3/2000 | Daio et al. |
| 6,045,944 A | 4/2000 | Okada et al. |
| 6,066,184 A | 5/2000 | Brenner |
| 6,143,440 A | 11/2000 | Volz et al. |
| 6,221,524 B1 | 4/2001 | Andrew et al. |
| 6,245,452 B1 | 6/2001 | Oltman |
| 6,265,100 B1 | 7/2001 | Saaski et al. |
| 6,277,522 B1 | 8/2001 | Omaru et al. |
| 6,277,752 B1 | 8/2001 | Chen |
| 6,287,719 B1 | 9/2001 | Bailey |
| 6,312,848 B1 | 11/2001 | Kilb et al. |
| 6,379,839 B1 | 4/2002 | Inoue et al. |
| 6,443,999 B1 | 9/2002 | Cantave et al. |
| 6,468,691 B1 | 10/2002 | Malay et al. |
| 6,495,293 B1 | 12/2002 | Arai et al. |
| 6,516,266 B2 | 2/2003 | Shoji |
| 6,682,853 B2 | 1/2004 | Kimijima et al. |
| 6,723,466 B2 | 4/2004 | Oogami et al. |
| 6,884,541 B2 | 4/2005 | Enomoto et al. |
| 6,896,994 B2 | 5/2005 | Urairi et al. |
| 6,964,690 B2 | 11/2005 | Goda et al. |
| 7,108,941 B2 | 9/2006 | Hayashi et al. |
| 7,195,840 B2 | 3/2007 | Kaun |
| 7,276,092 B2 | 10/2007 | Holl et al. |
| 7,341,802 B1 | 3/2008 | Ota et al. |
| 7,432,014 B2 | 10/2008 | Konishiike et al. |
| 7,455,929 B2 | 11/2008 | Dopp et al. |
| 7,488,553 B2 | 2/2009 | Tsukamoto et al. |
| 7,566,515 B2 | 7/2009 | Suzuki et al. |
| 7,575,830 B2 | 8/2009 | Kawamura et al. |
| 7,579,105 B2 | 8/2009 | Yoppolo et al. |
| 7,582,387 B2 | 9/2009 | Howard et al. |
| 7,641,992 B2 | 1/2010 | Howard et al. |
| 7,642,013 B2 | 1/2010 | Howard et al. |
| 7,662,509 B2 | 2/2010 | Howard et al. |
| 7,745,041 B2 | 6/2010 | Kozuki et al. |
| 7,794,869 B2 | 9/2010 | Howard et al. |
| 7,803,481 B2 | 9/2010 | Howard et al. |
| 7,811,708 B2 | 10/2010 | Lampe-Onnerud et al. |
| 7,816,026 B2 | 10/2010 | Janmey |
| 7,858,236 B2 | 12/2010 | Howard et al. |
| 7,883,790 B2 | 2/2011 | Howard et al. |
| 7,931,980 B2 | 4/2011 | Kwak et al. |
| 7,951,476 B2 | 5/2011 | Kim |
| 7,981,541 B2 | 7/2011 | Sato et al. |
| 8,021,775 B2 | 9/2011 | Kaun |
| 8,048,570 B2 | 11/2011 | Visco et al. |
| 8,236,441 B2 | 8/2012 | Gardner et al. |
| 8,435,658 B2 | 5/2013 | Yamashita et al. |
| 8,465,860 B2 | 6/2013 | Pozin et al. |
| 8,703,327 B2 | 4/2014 | Kim et al. |
| 9,077,022 B2 | 7/2015 | Howard et al. |
| 9,899,640 B2 | 2/2018 | Yabushita et al. |
| 2001/0009737 A1 | 7/2001 | Lane |
| 2001/0016282 A1 | 8/2001 | Kilb et al. |
| 2002/0034680 A1 | 3/2002 | Inoue et al. |
| 2002/0106559 A1 | 8/2002 | Takahashi et al. |
| 2002/0146621 A1 | 10/2002 | Yageta et al. |
| 2002/0192559 A1 | 12/2002 | Yoshimura et al. |
| 2003/0003370 A1 | 1/2003 | Arai et al. |
| 2003/0013007 A1 | 1/2003 | Kaun |
| 2003/0068557 A1 | 4/2003 | Kumashiro et al. |
| 2003/0138693 A1 | 7/2003 | Suzuki et al. |
| 2003/0162088 A1 | 8/2003 | Nakanishi et al. |
| 2003/0175589 A1 | 9/2003 | Kaminaka et al. |
| 2003/0193317 A1 | 10/2003 | Shimamura et al. |
| 2004/0029004 A1 | 2/2004 | Miyaki |
| 2004/0048151 A1 | 3/2004 | Hayashi et al. |
| 2004/0048160 A1 | 3/2004 | Omaru |
| 2004/0081895 A1 | 4/2004 | Adachi et al. |
| 2004/0110061 A1 | 6/2004 | Haug et al. |
| 2004/0115521 A1 | 6/2004 | Cho |
| 2004/0202933 A1 | 10/2004 | Yamaki et al. |
| 2005/0042506 A1 | 2/2005 | Tomimoto et al. |
| 2005/0058904 A1 | 3/2005 | Kano et al. |
| 2005/0064283 A1 | 3/2005 | Anderson et al. |
| 2005/0074667 A1 | 4/2005 | Yang |

(56) References Cited

U.S. PATENT DOCUMENTS

| | | |
|---|---|---|
| 2005/0142440 A1 | 6/2005 | Yamaki et al. |
| 2005/0171383 A1 | 8/2005 | Arai et al. |
| 2005/0181276 A1 | 8/2005 | Miyaki |
| 2005/0233212 A1 | 10/2005 | Kaun |
| 2005/0271938 A1 | 12/2005 | Suzuki et al. |
| 2006/0093894 A1 | 5/2006 | Scott et al. |
| 2006/0124973 A1 | 6/2006 | Arai et al. |
| 2006/0183020 A1 | 8/2006 | Davidson et al. |
| 2006/0228629 A1 | 10/2006 | Christian et al. |
| 2007/0037058 A1 | 2/2007 | Visco et al. |
| 2007/0117011 A1 | 5/2007 | Myerberg et al. |
| 2007/0122698 A1 | 5/2007 | Mitchell et al. |
| 2007/0172728 A1 | 7/2007 | Yamashita et al. |
| 2007/0200101 A1 | 8/2007 | Asao et al. |
| 2008/0003500 A1 | 1/2008 | Issaev et al. |
| 2008/0003503 A1 | 1/2008 | Kawakami et al. |
| 2008/0050652 A1 | 2/2008 | Hirose et al. |
| 2008/0240480 A1 | 10/2008 | Pinnell et al. |
| 2008/0241645 A1 | 10/2008 | Pinnell et al. |
| 2008/0318126 A1 | 12/2008 | Ishii |
| 2009/0123840 A1 | 5/2009 | Shirane et al. |
| 2009/0208849 A1 | 8/2009 | Pozin et al. |
| 2009/0325062 A1 | 12/2009 | Brenner et al. |
| 2010/0196756 A1 | 8/2010 | Wakita et al. |
| 2010/0227217 A1 | 9/2010 | Fujikawa et al. |
| 2010/0266893 A1 | 10/2010 | Martin et al. |
| 2011/0091753 A1 | 4/2011 | Wang et al. |
| 2011/0200871 A1 | 8/2011 | Pytlik et al. |
| 2012/0015224 A1 | 1/2012 | Pytlik et al. |
| 2012/0028110 A1 | 2/2012 | Brenner |
| 2012/0058386 A1 | 3/2012 | Wyser et al. |
| 2012/0100406 A1 | 4/2012 | Gaugler |
| 2013/0130066 A1 | 5/2013 | Pytlik et al. |
| 2013/0216881 A1 | 8/2013 | Gaugler |

FOREIGN PATENT DOCUMENTS

| | | |
|---|---|---|
| CN | 2502410 Y | 7/2002 |
| CN | 2632871 Y | 8/2004 |
| CN | 1630126 A | 6/2005 |
| CN | 1744347 A | 3/2006 |
| CN | 2847540 Y | 12/2006 |
| CN | 2874790 Y | 2/2007 |
| CN | 1960040 A | 5/2007 |
| CN | 101120462 A | 2/2008 |
| CN | 101202357 A | 6/2008 |
| CN | 101217188 A | 7/2008 |
| CN | 101286572 A | 10/2008 |
| CN | 101517820 A | 8/2009 |
| CN | 201440429 U | 4/2010 |
| DE | 3113309 A1 | 10/1982 |
| DE | 3638793 A1 | 5/1988 |
| DE | 19647593 A1 | 5/1998 |
| DE | 69700312 T2 | 2/2000 |
| DE | 19857638 A1 | 6/2000 |
| DE | 102009008859 A1 | 8/2010 |
| DE | 102009017514 A1 | 10/2010 |
| EP | 0202857 B1 | 7/1991 |
| EP | 0829105 A1 | 3/1998 |
| EP | 1137091 A1 | 9/2001 |
| EP | 1315220 A1 | 5/2003 |
| EP | 1318561 A1 | 6/2003 |
| EP | 1339115 A1 | 8/2003 |
| EP | 1372209 A1 | 12/2003 |
| EP | 1808916 A1 | 7/2007 |
| EP | 1873846 A1 | 1/2008 |
| EP | 1886364 A1 | 2/2008 |
| EP | 1968134 A1 | 9/2008 |
| GB | 1088271 A | 10/1967 |
| GB | 2110464 A | 6/1983 |
| JP | S58-10375 A | 1/1983 |
| JP | S5842167 A | 3/1983 |
| JP | S58-154178 A | 9/1983 |
| JP | S59-78460 A | 5/1984 |
| JP | S60-148058 A | 8/1985 |
| JP | S62-113358 A | 5/1987 |
| JP | S62-139265 A | 6/1987 |
| JP | S62-272472 A | 11/1987 |
| JP | S63-285878 A | 11/1988 |
| JP | H01-307176 A | 12/1989 |
| JP | H01309254 A | 12/1989 |
| JP | H02-56871 A | 2/1990 |
| JP | H02-60072 A | 2/1990 |
| JP | H03-225748 A | 10/1991 |
| JP | H04-249073 A | 9/1992 |
| JP | H05-121056 A | 5/1993 |
| JP | H06-96750 A | 4/1994 |
| JP | H07-153467 A | 6/1995 |
| JP | H07-153488 A | 6/1995 |
| JP | H08-293299 A | 11/1996 |
| JP | H11-40189 A | 2/1999 |
| JP | H11-135101 A | 5/1999 |
| JP | H11176414 A | 7/1999 |
| JP | 2937456 B2 | 8/1999 |
| JP | H11245066 A | 9/1999 |
| JP | H11-345626 A | 12/1999 |
| JP | H11-354150 A | 12/1999 |
| JP | 2000-77040 A | 3/2000 |
| JP | 2000082486 A | 3/2000 |
| JP | 2000-164259 A | 6/2000 |
| JP | 2000156218 A | 6/2000 |
| JP | 2000331717 A | 11/2000 |
| JP | 2002-042744 A | 2/2002 |
| JP | 2002-100408 A | 4/2002 |
| JP | 2002-134073 A | 5/2002 |
| JP | 2002-134096 A | 5/2002 |
| JP | 2002-164076 A | 6/2002 |
| JP | 2002-289257 A | 10/2002 |
| JP | 2002-289259 A | 10/2002 |
| JP | 2002-289260 A | 10/2002 |
| JP | 2002-298803 A | 10/2002 |
| JP | 2002-324584 A | 11/2002 |
| JP | 2002-352789 A | 12/2002 |
| JP | 2003-031266 A | 1/2003 |
| JP | 2003-077543 A | 3/2003 |
| JP | 2003-123830 A | 4/2003 |
| JP | 2003217562 A | 7/2003 |
| JP | 2003-249201 A | 9/2003 |
| JP | 2004-139800 A | 5/2004 |
| JP | 2004-158318 A | 6/2004 |
| JP | 2004-362968 A | 12/2004 |
| JP | 2006-040596 A | 2/2006 |
| JP | 3902330 B2 | 4/2007 |
| JP | 2007-200683 A | 8/2007 |
| JP | 2007-220601 A | 8/2007 |
| JP | 2007207535 A | 8/2007 |
| JP | 2007-294111 A | 11/2007 |
| JP | 2008-047303 A | 2/2008 |
| JP | 2008103109 A | 5/2008 |
| JP | 2008198552 A | 8/2008 |
| JP | 2008-251192 A | 10/2008 |
| JP | 2008-262825 A | 10/2008 |
| JP | 2008-262826 A | 10/2008 |
| JP | 2008-262827 A | 10/2008 |
| JP | 2009-199761 A | 9/2009 |
| KR | 20030087316 A | 11/2003 |
| WO | WO 2008118478 A1 | 10/2008 |
| WO | 2010/089152 A1 | 8/2010 |

OTHER PUBLICATIONS

Qu, Guoqiang, "Initial Analysis on the Working Principle of Through the Partition Welding," Feb. 1989.

Yi, Si-ping et al. "Laser Auto-Welding for Lithium Battery Tab," Chinese Journal of Power Sources, vol. 29, No. 2, pp. 80-81, Feb. 2005.

"Button Cell," *Electropedia*, International Electrotechnical Commission, Apr. 2004.

"Notification of invalidation request acceptance" against Chinese patent No. 201080036551.3, Jan. 2020.

"Annulment" against EP 2 394 324 B1, Jan. 22, 2020.

"Complaint for Patent Infringement" of U.S. Pat. No. 9,153,835;

(56) References Cited

OTHER PUBLICATIONS

U.S. Pat. No. 9,496,581; and U.S. Pat. No. 9,799,913 against Samsung Electronics America, Inc., Feb. 5, 2020.
Linden, D. et al. "Handbook of Batteries," 2002, Third Edition, The McGraw-Hill Companies, Inc., Sections 11.4, 11.4.1, 14.1,14.5.2, 14.8 and 14.8.2, and Figs. 11.2, 11.5, 14.38, 34.13, 35.30 and 35.32.
"Complaint for Patent Infringement" of U.S. Pat. No. 9,153,835; U.S. Pat. No. 9,496,581; and U.S. Pat. No. 9,799,913 against Amazon.com, Inc., Feb. 24, 2020.
"Complaint for Patent Infringement" of U.S. Pat. No. 9,153,835; U.S. Pat. No. 9,496,581; U.S. Pat. No. 9,799,913; and U.S. Pat. No. 9,799,858 against Best Buy Co., Inc., Feb. 24, 2020.
"Complaint for Patent Infringement" of U.S. Pat. No. 9,153,835; U.S. Pat. No. 9,496,581; and U.S. Pat. No. 9,799,913 against Costco Wholesale Corporation, Feb. 24, 2020.
"Complaint for Patent Infringement" of U.S. Pat. No. 9,153,835; U.S. Pat. No. 9,496,581; U.S. Pat. No. 9,799,913; and U.S. Pat. No. 9,799,858 against Audio Partnership LLC and Audio Partnership PLC, Mar. 3, 2020.
"Complaint for Patent Infringement" of U.S. Pat. No. 9,153,835; U.S. Pat. No. 9,496,581; U.S. Pat. No. 9,799,913; and U.S. Pat. No. 9,799,858 against PEAG, LLC, Mar. 4, 2020.
"Notice of acceptance of request for invalidation" against Chinese patent application No. 201080007121.9, Jun. 17, 2020.
InvenTekCorp., "Our Technology," Dec. 6, 2004, https://web.archive.org/web/20041206230046/http://inventekcorp.com/page3.html.
InvenTek Corporation, "Powerful Design: Technology," Nov. 22, 2007, https://web.archive.org/web/20071122010915/http://inventekcorp.com/technology.html.
InvenTek Corporation, "Powerful Design: Partners," Nov. 22, 2007, https://web.archive.org/web/20071122011734/http://inventekcorp.com/partners.html.
Saft Specialty Battery Group, "Premium lithium battery LM 17130," Doc. No 31089-2-0908, Sep. 2008.
Saft, "Premium lithium battery LM 22150," Doc N° 32040-2-0313, Mar. 2013.
Saft Specialty Battery Group, "Premium lithium battery LO 34 SX," Doc N° 31099-2-0411, Apr. 2011.
Saft Specialty Battery Group, "Rechargeable lithium-ion battery VL 34480," Doc. N° 54054-2-0607, Jun. 2007.
Saft, "Saft lithium batteries: Selector guide," Doc. N° 54083-2-0320, Mar. 2010.
Saft, "Saft lithium batteries: Selector guide," Doc. N° 54083-2-0613, Jun. 2013.
Saft Specialty Battery Group, "Saft lithium-ion rechargeable batteries for transportable power applications," Doc. N° 54047-2-0706, Jul. 2006.
Ultralife Corporation, "UB0006," https://www.ultralifecorporation.com/ECommerce/product/ub0006/type-ba-5367-33v-limno2, retrieved Jul. 15, 2020.
Ultralife Batteries, Inc., "UB0006: BA-5367/U" https://web.archive.org/web/20061109153052/http://www.ultralifebatteries.com/datasheet.php?ID=UB0006#top, Nov. 9, 2006.
Ultralife Batteries, Inc., "BA-5367/U Technical Datasheet," Aug. 4, 2006.
Ultralife Corporation, "BA-5367/U Technical Datasheet," Aug. 27, 2015.
Ultralife Batteries, Inc., "Product Summary Guide: Technical Datasheet," Sep. 27, 2006.
Ultralife Batteries, Inc., "Ultralife: Lithium-Manganese Dioxide Primary and Lithium Ion Rechargeable Batteries," Dec. 13, 2004.
Ultralife Corporation, "Lithium Carbon Mono-fluoride / Manganese Dioxide Hybrid Application Guide," Apr. 2, 2014.
Defendants' P.R. 3-3 Invalidity Contentions, Jul. 10, 2020.
Petition for Inter Partes Review of U.S. Pat. No. 9,799,858, Jul. 7, 2020.
Petition for Inter Partes Review of U.S. Pat. No. 9,153,835, Jul. 7, 2020.
Petition for Inter Partes Review of U.S. Pat. No. 9,496,581, Jul. 7, 2020.
Petition for Inter Partes Review of U.S. Pat. No. 9,799,913, Jul. 7, 2020.
Exhibit 1 of Defendant's Invalidity Contentions, Jul. 10, 2020.
Exhibit 2 of Defendant's Invalidity Contentions, Jul. 10, 2020.
Exhibit 3 of Defendant's Invalidity Contentions, Jul. 10, 2020.
Exhibit 4 of Defendant's Invalidity Contentions, Jul. 10, 2020.
Exhibit 5 of Defendant's Invalidity Contentions, Jul. 10, 2020.
Exhibit 6 of Defendant's Invalidity Contentions, Jul. 10, 2020.
Exhibit 7 of Defendant's Invalidity Contentions, Jul. 10, 2020.
Exhibit 8 of Defendant's Invalidity Contentions, Jul. 10, 2020.
Exhibit 9 of Defendant's Invalidity Contentions, Jul. 10, 2020.
Exhibit 10 of Defendant's Invalidity Contentions, Jul. 10, 2020.
Exhibit 11 of Defendant's Invalidity Contentions, Jul. 10, 2020.
Jul. 10, 2020 Statement of Thomas Kaun.
Patent Owner's Preliminary Response, Case IPR 2020-01211, U.S. Pat. No. 9,496,581, Oct. 7, 2020.
Patent Owner's Preliminary Response, Case IPR 2020-01212, U.S. Pat. No. 9,153,835, Oct. 7, 2020.
Patent Owner's Preliminary Response, Case IPR 2020-01213, U.S. Pat. No. 9,799,858, Oct. 7, 2020.
Patent Owner's Preliminary Response, Case IPR 2020-01214, U.S. Pat. No. 9,799,913, Oct. 7, 2020.
Declaration of Dr. Martin Peckerar Regarding Claim Construction, Oct. 23, 2020.
Declaration of William H. Gardner, Jul. 7, 2020.
Supplemental Expert Declaration of William H. Gardner, Oct. 23, 2020.
William H. Gardner CV, Oct. 7, 2020.
Frankenberger, Martin et al. "Laminated Lithium Ion Batteries with improved fast charging capability," Journal of Electroanalytical Chemistry 837 (2019) 151-158, Elsevier B.V., Feb. 17, 2019.
Chart comparing U.S. Pat. No. 9,799,858 to PCT/EP2010/058637, Jul. 7, 2020.
Email chain re: *VARTA* v. *PEAG LLC* (E.D.Tex. No. 2:20-71) and *VARTA* v. *Audio Partnership LLC* (N.D.III. No. 1:20-1568), Apr. 27, 2020.
First Amended Consolidation Order, Case No. 2:20-cv-00051, Document 21, filed May 7, 2020.
Discovery Order in Civil Action Nos. 2:20-00029, 2:20-00071, 2:20-00138; Case No. 2:20-cv-00051-JRG; Document 51; filed Jun. 10, 2020.
Docket Control Order, Case No. 2:20-cv-00051-JRG, Document 54, filed Jun. 11, 2020.
Defendants PEAG, LLC D/B/A JLab Audio, Audio Partnership LLC and Audio Partnership PLC D/B/A Cambridge Audio's Opposed Motion to Stay Pending Inter Partes Review in Case Nos. 2:20-CV-00071 and 2:20-CV-00138; Case 2:20-cv-0051-JRG; Document 64; filed Aug. 20, 2020.
Plaintiff VARTA Microbattery GmbH's Opposition to Defendants' Motion to Stay Pending Inter Partes Review, Case 2:20-cv-00051-JRG, Document 65, filed Sep. 3, 2020.
Order denying stay, Case 2:20-cv-00051-JRG, Document 68, filed Oct. 6, 2020.
Complaint for Patent Infringement of U.S. Pat. No. 9,153,835; U.S. Pat. No. 9,496,581; U.S. Pat. No. 9,799,913; and U.S. Pat. No. 9,799,858 against Cambridge Audio, Case 2:20-cv-00138, Document 1, filed May 4, 2020.
Defendant PEAG, LLC D/B/A JLab Audio's Answer to Complaint for Patent Infringement, Case 2:20-cv-00051-JRG, Document 26, filed May 13, 2020.
Joint Motion for Entry of Docket Control Order, Case 2:20-cv-00051-JRG, Document 45, filed Jun. 8, 2020.
"VARTA's Opening Claim Construction Brief," with Exhibits, Case 2:20-cv-00051-JRG, Document 77, filed Dec. 4, 2020.
"Defendants' Responsive Claim Construction Brief in Case Nos. 2:20-CV-00071 and 2:20-CV-00138," with Exhibits, Case 2:20-cv-00051-JRG, Document 80, filed Dec. 18, 2020.
"VARTA's Reply Claim Construction Brief," Case 2:20-cv-00051-JRG, Document 81, filed Dec. 28, 2020.
"Patent Rule 4-5(d) Joint Claim Construction Chart," with Exhibits, Case 2:20-cv-00051-JRG, Document 84, filed Jan. 4, 2021.
Decision Granting Institution of Inter Partes Review, Case IPR 2020-01211, U.S. Pat. No. 9,496,581, Jan. 6, 2021.

(56) References Cited

OTHER PUBLICATIONS

Decision Granting Institution of Inter Partes Review, Case IPR 2020-01212, U.S. Pat. No. 9,153,835, Jan. 6, 2021.
Decision Granting Institution of Inter Partes Review, Case IPR 2020-01213, U.S. Pat. No. 9,799,858, Jan. 6, 2021.
Decision Granting Institution of Inter Partes Review, Case IPR 2020-01214, U.S. Pat. No. 9,979,913, Jan. 6, 2021.
IPR 2020-01211 Patent Owner's Response with Exhibits, Mar. 31, 2021.
IPR 2020-01212 Patent Owner's Response with Exhibits, Mar. 31, 2021.
IPR 2020-01213 Patent Owner's Response with Exhibits, Mar. 31, 2021.
IPR 2020-01214 Patent Owner's Response with Exhibits, Mar. 31, 2021.
IPR 2020-01211 Patent Owner's Contingent Motion to Amend with Exhibits, Mar. 31, 2021.
IPR 2020-01212 Patent Owner's Contingent Motion to Amend with Exhibits, Mar. 31, 2021.
IPR 2020-01213 Patent Owner's Contingent Motion to Amend with Exhibits, Mar. 31, 2021.
IPR 2020-01214 Patent Owner's Contingent Motion to Amend with Exhibits, Mar. 31, 2021.
IPR2020-01211 Petitioner Response with Exhibits, Jun. 23, 2021.
IPR2020-01211 Petitioner Opposition to Motion to Amend with Exhibits, Jun. 23, 2021.
IPR2020-01212 Petitioner Response with Exhibits, Jun. 23, 2021.
IPR2020-01212 Petitioner Opposition to Motion to Amend with Exhibits, Jun. 23, 2021.
IPR2020-01213 Petitioner Response with Exhibits, Jun. 23, 2021.
IPR2020-01213 Petitioner Opposition to Motion to Amend with Exhibits, Jun. 23, 2021.
IPR2020-01214 Petitioner Response with Exhibits, Jun. 23, 2021.
IPR2020-01214 Petitioner Opposition to Motion to Amend with Exhibits, Jun. 23, 2021.
IPR2021-00474 Petition for IPR of U.S. Pat. No. 9,496,581 with Exhibits, Feb. 2, 2021.
IPR2021-00474 Notice of Filing Date Accorded to Petition and Time for Filing Patent Owner Preliminary Response, Feb. 10, 2021.
IPR2021-00474 Petitioner Eve Energy Co., Ltd.'s Power of Attorney, Feb. 1, 2021.
IEC, International Standard, Primary batteries—Part 2: Physical and electrical specifications, IEC 60086-2, eleventh edition, Dec. 2006, International Electrotechnical Commission, Switzerland, pp. 1-64.
IPR2021-01207 Petition for IPR of U.S. Pat. No. 10,804,506 with Exhibits, Jun. 30, 2021.
"Declaration of William H. Gardner," IPR2021-01206 and IPR2021-01207, Jun. 29, 2021.
IPR2021-01206 Petition for IPR of U.S. Pat. No. 10,971,776 with Exhibits, Jun. 30, 2021.
IPR2021-00474, U.S. Pat. No. 9,496,581, Paper 6, Patent Owner's Preliminary Response with Exhibit, Jul. 13, 2021.
IPR2021-00474, U.S. Pat. No. 9,496,581, Paper 10, Decision Granting IPR, Aug. 9, 2021.
IPR2020-01212, U.S. Pat. No. 9,153,835, Paper 27, Patent Owner's Revised Contingent Motion to Amend with Exhibits, Aug. 4, 2021.
IPR2020-01212, U.S. Pat. No. 9,153,835, Paper 28, Patent Owner's Sur-Reply with Exhibits, Aug. 4, 2021.
IPR2020-01211, U.S. Pat. No. 9,496,581, Paper 28, Patent Owner's Revised Contingent Motion to Amend with Exhibits, Aug. 4, 2021.
IPR2020-01211, U.S. Pat. No. 9,496,581, Paper 29, Patent Owner's Sur-Reply with Exhibits, Aug. 4, 2021.
IPR2020-01213, U.S. Pat. No. 9,799,858, Paper 28, Patent Owner's Revised Contingent Motion to Amend with Exhibits, Aug. 4, 2021.
IPR2020-01213, U.S. Pat. No. 9,799,858, Paper 29, Patent Owner's Sur-Reply with Exhibits, Aug. 4, 2021.
IPR2020-01214, U.S. Pat. No. 9,799,913, Paper 27, Patent Owner's Revised Contingent Motion to Amend with Exhibits, Aug. 4, 2021.
IPR2020-01214, U.S. Pat. No. 9,799,913, Paper 28, Patent Owner's Sur-Reply with Exhibits, Aug. 4, 2021.
U.S. Appl. No. 15/696,354, filed Sep. 6, 2017.
U.S. Appl. No. 16/693,538, filed Nov. 25, 2019.
U.S. Appl. No. 16/798,509, filed Feb. 24, 2020.
U.S. Appl. No. 16/812,482, filed Mar. 9, 2020.
U.S. Appl. No. 16/792,420, filed Feb. 17, 2020.
U.S. Appl. No. 16/796,977, filed Feb. 21, 2020.
U.S. Appl. No. 16/810,976, filed Mar. 6, 2020.
U.S. Appl. No. 16/810,998, filed Mar. 6, 2020.
U.S. Appl. No. 16/813,776, filed Mar. 10, 2020.
U.S. Appl. No. 17/173,257, filed Feb. 11, 2021.
U.S. Appl. No. 15/433,654, filed Feb. 15, 2017.
U.S. Appl. No. 17/464,811, filed Sep. 2, 2021.
U.S. Appl. No. 17/173,222, filed Feb. 11, 2021.
U.S. Appl. No. 15/699,435, filed Sep. 8, 2017.
U.S. Appl. No. 17/238,329, filed Apr. 23, 2021.
IPR2021-00474, U.S. Pat. No. 9,496,581, Patent Owner's Contingent Motion to Amend with Exhibits, Nov. 8, 2021.
IPR2021-00474, U.S. Pat. No. 9,496,581, Patent Owner's Response with Exhibits, Nov. 8, 2021.
IPR2020-01211, U.S. Pat. No. 9,496,581, Patent Owner's Reply in Support of its Revised Contingent Motion to Amend with New Exhibit, Oct. 8, 2021.
IPR2020-01212, U.S. Pat. No. 9,153,835, Patent Owner's Reply in Support of its Revised Contingent Motion to Amend with New Exhibit, Oct. 8, 2021.
IPR2020-01213, U.S. Pat. No. 9,799,858, Patent Owner's Reply in Support of its Revised Contingent Motion to Amend with New Exhibit, Oct. 8, 2021.
IPR2020-01214, U.S. Pat. No. 9,799,913, Patent Owner's Reply in Support of its Revised Contingent Motion to Amend with New Exhibit, Oct. 8, 2021.
IPR2021-01206, U.S. Pat. No. 10,971,776, Patent Owner's Preliminary Response, Oct. 12, 2021.
IPR2021-01207, U.S. Pat. No. 10,804,506, Patent Owner's Preliminary Response, Oct. 12, 2021.
IPR2020-01211, U.S. Pat. No. 9,496,581, Paper 35, Petitioner's Opposition to Patent Owner's Revised Contingent Motion to Amend with Exhibits, Sep. 17, 2021.
IPR2020-01212, U.S. Pat. No. 9,153,835, Paper 34, Petitioner's Opposition to Patent Owner's Revised Contingent Motion to Amend with Exhibits, Sep. 17, 2021.
IPR2020-01213, U.S. Pat. No. 9,799,858, Paper 35, Petitioner's Opposition to Patent Owner's Revised Contingent Motion to Amend with Exhibits, Sep. 17, 2021.
IPR2020-01214, U.S. Pat. No. 9,799,913, Paper 34, Petitioner's Opposition to Patent Owner's Revised Contingent Motion to Amend with Exhibits, Sep. 17, 2021.
IPR2021-01207, U.S. Pat. No. 10,804,506, Decision Denying Institution of Inter Partes Review, Jan. 5, 2022.
IPR2021-01206, U.S. Pat. No. 10,971,776, Decision Denying Institution of Inter Partes Review, Jan. 5, 2022.
IPR2020-01214, U.S. Pat. No. 9,799,913, Judgment Final Written Decision, Jan. 5, 2022.
IPR2020-01212, U.S. Pat. No. 9,153,835, Judgment Final Written Decision, Jan. 5, 2022.
IPR2020-01213, U.S. Pat. No. 9,799,858, Judgment Final Written Decision, Jan. 5, 2022.
IPR2020-01211, U.S. Pat. No. 9,496,581, Judgment Final Written Decision, Jan. 5, 2022.
IPR2021-00474, U.S. Pat. No. 9,496,581, Petitioner's Reply to Patent Owner Response with Exhibit, dated Jan. 31, 2022.
IPR2021-00474, U.S. Pat. No. 9,496,581, Petitioner's Opposition to Patent Owner's Contingent Motion to Amend with Exhibit, dated Jan. 31, 2022.
IPR2021-00474, U.S. Pat. No. 9,496,581, Patent Owner's Sur-Reply, dated Mar. 7, 2022.
IPR2021-00474, U.S. Pat. No. 9,496,581, Patent Owner's Reply in Support of its Contingent Motion to Amend with Exhibit, dated Mar. 7, 2022.
U.S. Appl. No. 13/146,669, filed Sep. 7, 2011.
U.S. Appl. No. 15/283,568, filed Oct. 3, 2016.

(56) References Cited

OTHER PUBLICATIONS

U.S. Appl. No. 14/827,387, filed Aug. 17, 2015.
U.S. Appl. No. 13/378,117, filed Dec. 14, 2011.
U.S. Appl. No. 17/697,059, filed Mar. 17, 2022.
U.S. Appl. No. 17/697,961, filed Mar. 18, 2022.

BUTTON CELL HAVING WINDING ELECTRODE AND METHOD FOR THE PRODUCTION THEREOF

CROSS-REFERENCE TO PRIOR APPLICATIONS

This application is a divisional of U.S. application Ser. No. 17/238,329, filed Apr. 23, 2021, which is a divisional of U.S. application Ser. No. 17/173,222, filed Feb. 11, 2021 (now U.S. Pat. No. 11,024,907), which is a divisional of U.S. application Ser. No. 15/699,435, filed Sep. 8, 2017 (now U.S. Pat. No. 11,024,904), which is a divisional of U.S. application Ser. No. 13/378,117 filed Dec. 14, 2011 (now U.S. Pat. No. 9,799,858), which is a § 371 of International Application No. PCT/EP2010/058637, with an international filing date of Jun. 18, 2010 (WO 2010/146154 A2, published Dec. 23, 2010), which claims priority to German Patent Application Nos. DE 10 2009 030 359.6, filed Jun. 18, 2009, and DE 10 2009 060 800.1, filed Dec. 31, 2009, all of which applications are hereby incorporated by reference herein.

FIELD

This disclosure relates to button cells having a housing consisting of two metal housing halves, which contains a wound electrode separator assembly, and to a method for its production.

BACKGROUND

Button cells conventionally comprise a housing consisting of two housing halves: a cell cup and a cell top. These may, for example, be produced as stamped parts from nickel-plated deep-drawn sheet metal. Usually, the cell cup is positively poled and the housing top negatively poled. The housing may contain a very wide variety of electrochemical systems, for example, zinc/$MnO_2$, primary and secondary lithium systems, or secondary systems such as nickel/cadmium or nickel/metal hydride.

The liquid-tight closure of button cells is conventionally carried out by crimping the edge of the cell cup over the edge of the cell top, in combination with a plastic ring which is arranged between the cell cup and the cell top and is used simultaneously as a sealing element and for electrical insulation of the cell cup and the cell top. Such button cells are described, for example, in DE 31 13 309.

As an alternative, however, it is also possible to manufacture button cells in which the cell cup and the cell top are held together in the axial direction exclusively by a force-fit connection, and which correspondingly do not have a crimped cup edge. Such button cells and a method for their production are described in DE 10 2009 017 514.8. Regardless of the various advantages which such button cells without crimping may present, they nevertheless cannot withstand such high stresses in the axial direction as comparable button cells with a crimped cup edge, especially as regards axial mechanical loads which originate from inside the button cell. For example, the electrodes of rechargeable lithium ion systems are constantly subjected to volume changes during charging and discharging processes. In button cells without crimping, the axial forces occurring in this case can naturally cause leaks more easily compared with button cells with crimping.

A solution to this problem may be found in DE 10 2009 030 359.6 and DE 10 2009 008 859.8. Inter alia, references may be found therein to button cells comprising a housing having a plane bottom region and a plane top region parallel thereto, an assembly consisting of flat electrode layers and separator layers in the form of a preferably spiral-shaped electrode winding being arranged in the housing in such a way that the end sides of the winding face in the direction of the plane bottom region and the plane top region. The electrode layers of the winding are thus oriented essentially orthogonally to the plane bottom and top regions of the housing. As a result, radial forces such as occur during the aforementioned charging and discharging processes of lithium ion systems can in principle be absorbed better than in of conventional lithium ion button cells, in which electrode layers are arranged stacked in parallel alignment with the plane bottom and top regions.

Windings consisting of flat electrode layers and separator layers can be produced quite straightforwardly using known methods (see, for example, DE 36 38 793) by the electrodes being applied, in particular laminated, particularly in the form of strips, flat onto a separator provided as an endless band. The assembly consisting of the electrodes and separators is generally wound on a so-called "winding mandrel." After the winding has been removed from the winding mandrel, an axial cavity is left at the center of the winding, the effect of which is that the winding may possibly expand into this cavity. This, however, can sometimes lead to problems in the electrical contact of the electrodes with the metal housing halves.

It could therefore be helpful to provide a button cell in which the aforementioned problems do not occur, or only occur to a greatly reduced extent.

SUMMARY

The present invention provides a button cell. The button cell includes a button cell housing and an electrode separator assembly disposed inside the button cell housing. The button cell housing includes a metal cell cup, the metal cell cup having a cell cup plane region connected to a cell cup lateral surface region, a metal cell top, the metal cell top having a cell top plane region connected to a cell top lateral surface region, and an electrically insulating seal disposed between the cell cup lateral surface region and the cell top lateral surface region. The electrode separator assembly includes a positive electrode formed from a first portion of a first current collector, the first portion of the first current collector being coated with a first electrode material, the first electrode material being a lithium intercalating electrode material, a negative electrode formed from a first portion of a second current collector, the first portion of the second current collector being coated with a second electrode material, and a separator disposed between the positive electrode and the negative electrode. The positive electrode, the negative electrode, and the separator are wound into the form of a winding, end sides of the winding facing in a direction of the cell cup plane region and the cell top plane region such that layers of the electrode separator assembly are oriented essentially orthogonally to the cell cup plane region and the cell top plane region. A second portion of the first current collector is directly electrically connected to a first plane region of the cell cup plane region and the cell top plane region. A second portion of the second current collector directly electrically connected to a second plane region of the cell cup plane region and the cell top plane region. The first current collector, including the first portion and the second portion thereof, is a first metallic foil or mesh. The second current collector, including the first portion and the second portion thereof, is a second metallic foil or mesh. A first direct electrical connection via weld is provided between one of: the second portion of the first current collector and the first plane region, and the second portion of the second current collector and the second plane region. The button cell is configured as a secondary lithium ion battery.

DETAILED DESCRIPTION

My button cell always comprises two metal housing halves separated from one another by an electrically insulating seal and forming a housing having a plane bottom region and a plane top region parallel thereto. As mentioned above, the two housing halves are generally a so-called "housing cup" and a "housing top." In particular, nickel-plated steel or sheet metal are preferred as the material for the housing halves. Trimetals, in particular, are furthermore suitable as the metallic material, for example, ones comprising the sequence nickel, steel (or stainless steel) and copper (in which case the nickel layer preferably forms the outer side of the button cell housing and the copper layer preferably forms the inner side).

As the seal, it is, for example, possible to use an injection-molded seal or a film seal. The latter are described, for example, in DE 196 47 593.

At least one positive electrode and at least one negative electrode are arranged inside the housing, specifically each in the form of flat electrode layers. The electrodes are preferably connected to one another by at least one flat separator. The electrodes are preferably laminated or adhesively bonded onto this separator. The electrodes and the separator generally each have a thickness only in the μm range. A porous plastic film is generally used as the separator.

This assembly is provided in the form of a winding, particularly in the form of a spiral-shaped winding, in the housing of a button cell, the winding being arranged such that its end sides face in the direction of the plane bottom region and the plane top region of the housing. Full reference is hereby made to the description of such windings, and button cells comprising such windings, in DE 10 2009 030 359.6 and DE 10 2009 008 859.8 already mentioned above. All the preferred forms described in those applications are also intended to apply for the button cell described here and the electrode winding described here.

Besides the housing halves and the electrode separator assembly, my button cell always also comprises metal conductors which electrically connect the at least one positive electrode and/or the at least one negative electrode respectively to one of the housing halves. The conductor or conductors connected to the at least one positive electrode preferably consist of aluminum. The conductors connected to the at least one negative electrode preferably consist of nickel or copper.

On the electrode side, the conductors are preferably connected to current collectors. The latter are generally metal foils or meshes conventionally coated on both sides with active electrode material. These current collectors preferably consist of aluminum on the side of the positive electrode, and preferably nickel or copper on the side of the negative electrode. The foils or meshes have, in particular, thicknesses of between 1 μm and 100 μm. The connecting of the conductors to the current collectors is preferably carried out by welding.

Particularly in respect of preferred forms of the electrode separator assembly arranged in my button cell, reference is made to DE 10 2009 030 359.6 and DE 10 2009 008 859.8. These disclose in particular preferred layer sequences and layer thicknesses for electrodes and separators, for example, an assembly comprising the layer sequence:

negative electrode/separator/positive electrode/separator or positive electrode/separator/negative electrode/separator.

Assemblies comprising the layer sequences:

negative electrode/separator/positive electrode/separator/negative electrode or positive electrode/separator/negative electrode/separator/positive electrode may also be preferred. The assembly therefore comprises more than one positive electrode and/or more than one negative electrode.

Particularly preferably, at least one of the electrodes of a button cell is a lithium intercalation electrode. The button cell is preferably a lithium ion battery, in particular a secondary lithium ion battery.

My button cell is distinguished particularly in that at least one of the conductors is welded to the respective housing half, preferably both the conductor connected to the at least one positive electrode and the conductor connected to the at least one negative electrode.

As has already been mentioned above, particularly in lithium ion button cells, the electrodes are subject to volume changes during a charging-discharging cycle, as a result of which contact problems may arise between the conductors and the housing halves. Such contact problems no longer apply when the conductors are welded to the respective housing halves.

Particularly preferably, the conductor or conductors are welded onto the inner side of the housing in the plane bottom region or the plane top region, respectively, of the housing. For this purpose, according to conventional methods the welding process must be carried out before the housing is assembled, which is very difficult to achieve in terms of production technology. Welded connections have therefore been regarded as highly disadvantageous for bonding the conductors to the inner side of the housing halves. By virtue of my method as described in more detail below, however, a solution can be provided which also has great advantages in terms of production technology.

By the welding, the at least one positive electrode and/or the at least one negative electrode are thus connected by one or more conductors directly to the plane bottom region or to the plane top region of the housing of a button cell, the housing top generally being poled negatively and the housing cup positively.

The button cell is preferably a conventional button cell having a circular plane bottom region and a circular plane top region. In some cases, the button cell may nevertheless have an oval configuration. It is, however, important that the ratio of height to diameter is preferably always less than 1. Particularly preferably, it is 0.1 to 0.9, in particular 0.15 to 0.7. The height is intended to mean the shortest distance between the plane bottom region and the plane top region parallel thereto. The diameter means the maximum distance between two points on the lateral region of the button cell.

Preferably, the conductors of a button cell are flat conductors, in particular metal foils, particularly preferably rectangular, strip- or band-shaped metal foils. The foils preferably have thicknesses of 5 µm to 100 µm.

The conductors are preferably separate components bonded, in particular welded, to the electrodes, in particular to the current collectors in the electrodes. As an alternative, however, the conductors may also be uncoated sections of a current collector (sections which are free of active electrode material), in particular the uncoated ends of such a current collector. By bending these uncoated sections, in particular these uncoated ends, for example, through 90°, these ends can be connected to the bottom or top region of a button cell. There, the connecting is preferably carried out by welding.

Preferably, at least one subsection of the conductor or conductors bears flat on the inner side of the housing half or halves in the bottom and/or top region of the housing, in particular when the conductors are flat conductors such as foils. Such conductors may form a flat layer between the inner side of the housing halves and an end side of the electrode winding, and therefore a large-area electrical contact with the housing.

Since in principle both positive and negative electrodes may be exposed on the end sides of the electrode winding, however, it is necessary to avoid a short circuit between the electrodes. Particularly preferably, my button cell therefore comprises at least one separate insulating means which prevents direct electrical contact between the end sides of the winding and the conductors, in particular a subsection of the conductor or conductors which bears flat on the inner side of the housing halves. Such an insulating means may, for example, be a film, for example, a plastic adhesive film, by which the side of the conductor or conductors remote from the inner side of the button cell housing is covered.

The electrode winding of a button cell may be produced by known methods, for example, the method described in DE 36 38 793, according to which electrodes and separators are wound on a winding mandrel. After the winding has been removed from the winding mandrel, there may be an axial cavity at the center of the winding, preferably an essentially cylindrical axial cavity. In the housing of my button cell, such a cavity is delimited laterally by the winding and on the end sides by the bottom or top region of the housing, respectively, or at least by a subregion thereof. Particularly preferably, the at least one conductor is welded to one housing half or the housing halves in one of these subregions.

The axial cavity may optionally contain a winding core, which can prevent the winding from expanding uncontrolledly into the cavity.

The button cell is in particular a button cell without crimping, as is described in DE 10 2009 017 514.8. Accordingly, there is preferably an exclusively force-fit connection between the housing halves. The but-ton cell thus does not have a crimped cup edge, as is always the case with button cells known from the prior art. The button cell is closed without crimping. The content of DE 10 2009 017 514.8 is also fully incorporated herein by reference. All the preferred forms described in that application is also intended to apply for the button cell described here and its housing.

As already mentioned above, welding of conductors to the inner side of button cell housings is very elaborate in terms of production technology. I overcome this problem with my method of producing button cells, which always comprises at least the following steps:

(a) providing a first and a second metal housing half (preferably a cell cup, and a cell top),
(b) placing an electrode separator assembly comprising a positive electrode and a negative electrode in one of the housing halves (preferably into the cell top), a metal conductor being bonded to at least one of the electrodes (preferably to all the electrodes),
(c) assembling the two housing halves (preferably by inserting the cell top into the cell cup), optionally with the provision of separate steps for sealing the housing (for example, fitting a seal) and
(d) welding at least one of the conductors to the inner side of one of the metal housing halves.

The components used in the method such as the housing halves, the conductors and the electrode separator assembly, have already been described above. Reference is hereby made to the corresponding remarks.

The method is distinguished in particular in that step (d) is carried out after step (c). This means that the at least one conductor is welded to the inner side of the housing when the housing is closed. The welding must correspondingly be carried out from the outside through the housing wall of one or both housing halves.

Accordingly, I provide button cells which have weld beads and/or weld spots that pass through the housing, in particular starting from its outer side.

Particularly preferably, the conductor or conductors and the button cell housing are connected to one another by one or more spot-like and/or linear welded connections.

Welding the conductors and the housing is preferably carried out by a laser. Its operating parameters must be adapted as accurately as possible to the thickness of the housing. The power may, for example, be modulated by varying the pulse frequency. Lastly, the laser should merely ensure welding of the housing and conductors while other components such as the electrode winding should as far as possible not be damaged.

Suitable lasers are, for example, commercially available fiber lasers, i.e., solid-state lasers, in which the doped core of a glass fiber forms the active medium. The most common dopant for the laser-active fiber core is erbium. For high-power applications as in the present case, however, ytterbium and neodymium are more preferred.

Irrespective of the fact that such lasers can be adapted very finely to the respective housing thickness and conductor dimension, it is nevertheless possible that in certain cases the intensity of the laser will be selected to be too strong and the laser will penetrate through the housing wall and the conductor. For this reason, welding the conductors to the housing is particularly preferably carried out in the subregion of the bottom or top region, which delimits the axial cavity at the center of the winding on the end side. If a laser beam penetrates through the housing in this region, the winding cannot be damaged. Instead, the laser beam will be absorbed by the housing half lying opposite or by a winding core optionally arranged inside the cavity.

If possible, the conductors to be welded should bear as flatly as possible on the inner side of the housing. This may, for example, be ensured by fixing the conductors flat by an adhesive tape onto or at the end sides of an electrode winding, before the latter is inserted into the housing.

The aforementioned advantages, and further advantages thereof, are in particular also revealed by the description which now follows of the drawings. In this context, the individual features may be implemented separately or in combination with one another. The examples described merely serve for explanation and better understanding, and are in no way to be interpreted as restrictive.

Figure 1A:
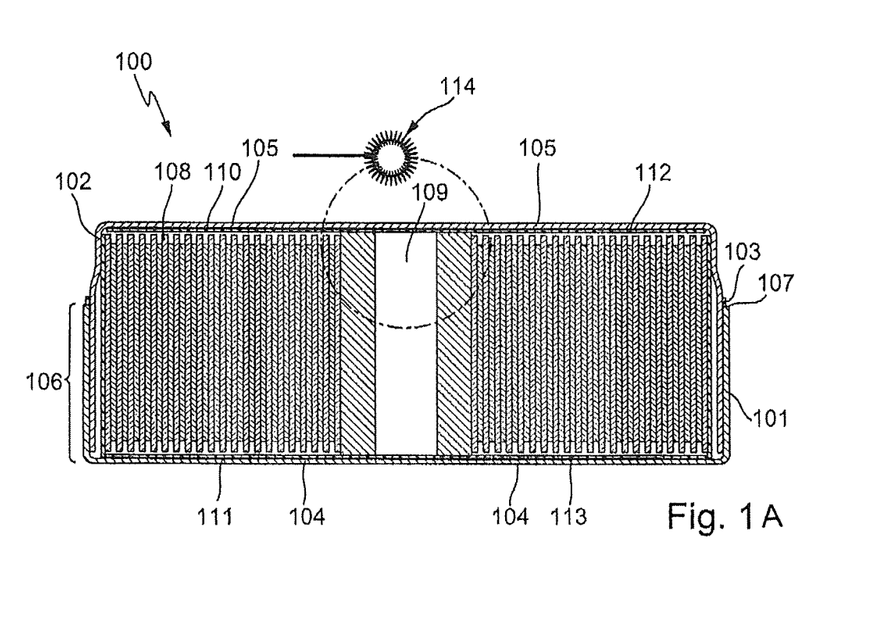
FIGS. 1A and 1B schematically show a cross section of a preferred example of a button cell 100.

Button cell 100 comprises two metal housing halves: a metal cup part 101 and a metal top part 102. With a seal 103 lying between them, the two parts are connected together in a leaktight fashion. Together, they form a housing having a plane bottom region 104 and a plane top region 105 parallel thereto. In the functional state, these two plane regions 104 and 105 form the poles of the button cell 100, from which current can be drawn by a load. The cell top 102 is inserted into the cell cup 101 so that the lateral surface regions of the cell top and the cell cup overlap, the internal radius of the cell cup 101 in the overlap region 106 being essentially constant in the direction of the rim 107. The edge of the cell 101 is thus not crimped. The button cell 100 is therefore an uncrimped button cell.

An assembly 108 of strip-shaped electrodes and strip-shaped separators is arranged inside the electrode. The assembly 108 is provided in the form of a spiral-shaped winding, the end sides of which face in the direction of the plane bottom region 104 and the plane top region 105 parallel thereto. The assembly is wound on the winding core 109 at the center of the button cell 100. The winding core is a hollow plastic cylinder, which partially fills an axial cavity at the center of the winding. The cavity itself is delimited laterally by the winding and upward and downward by corresponding circular sections of the plane cup and top regions of the button cell housing. Metal foils 110 and 111, which act as conductors and are connected to the electrodes, bear flat on these regions. These conductors are shielded from the end sides of the winding by the insulating elements 112 and 113. The latter are thin plastic films. The wall thickness of the housing in the region of the plane bottom or top region is generally 30 µm to 400 µm. The thickness of the metal foils 110 and 111 acting as conductors generally lies 5 µm to 100 µm.

Figure 1B:
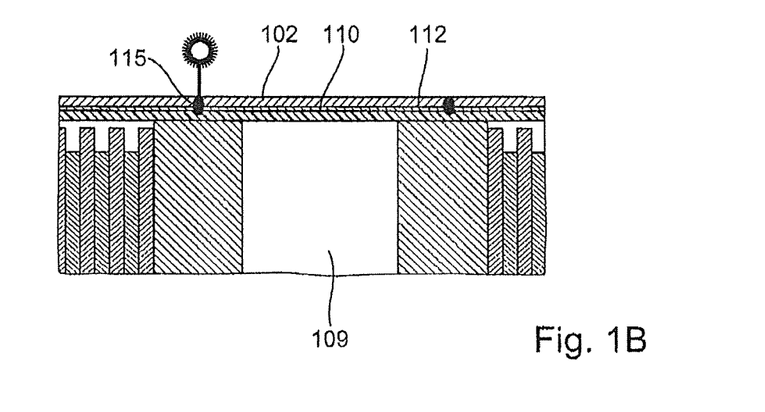

Welding of the metal foils 110 and 111, acting as conductors, to the respective housing half, which is preferably done by the schematically represented laser 114, is preferably carried out in that subregion of the bottom region or of the top region of the button cell housing which delimits the axial cavity at the center of the winding on the end side. This creates a weld bead 115 which passes fully through the housing of the button cell 100 from the outside inward, and by which the internally lying metal foils 110 and 111 acting as conductors are firmly connected to the inner side of the housing. This can be seen clearly in the detail enlargement (FIG. 1B).

Figure 2A:
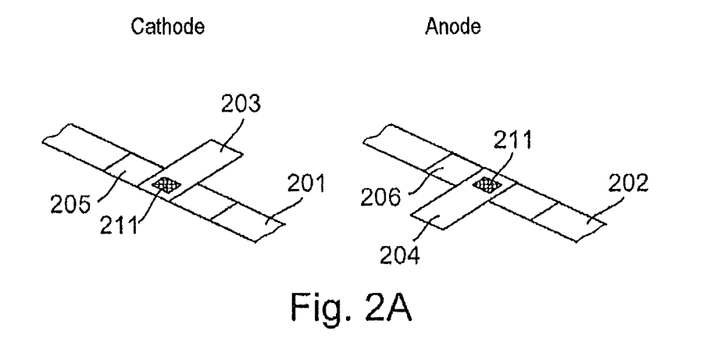
FIGS. 2A to 2C schematically show selected assembly steps of the button cell of FIG. 1.
Figure 2B:
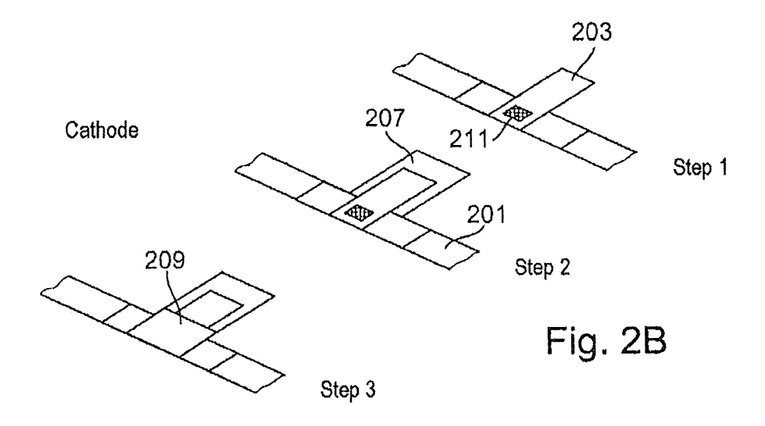
Figure 2C:
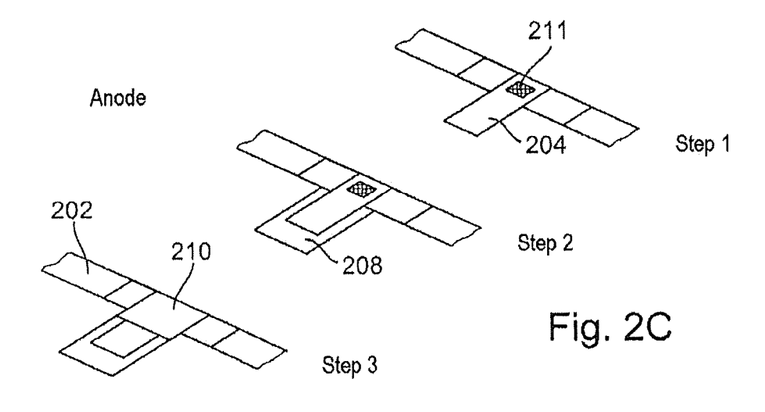

FIG. 2A to FIG. 2C represent some important steps in the production of an electrode winding, which is suitable in particular for button cells (for example, as represented in FIG. 1). Thus, FIG. 2A shows segmented collector foils 201 and 202 coated with active electrode material, to which conductor strips 203 and 204 offset at an angle of 90° are attached by welding. The conductor 204 on the anode side consists of nickel or copper, and the conductor 203 on the cathode side of aluminum. The conductors 203 and 204 are respectively applied in a material-free region (205, 206) of the collector foils 201 and 202. Elsewhere, they are coated with active material on both sides. The connection between the collector foils 201 and 202 and the conductors may, for example, be produced by welding in the region 211.

FIG. 2B and FIG. 2C represent the way in which the rear sides of the conductors 203 and 204 are adhesively bonded using an insulating tape 207 and 208 (for example, made of KAPTON or polypropylene) (Step 2). This insulating tape is subsequently intended to function as an insulating element, which is meant to prevent direct electrical contact between the conductors 203 and 204 and the end sides of the electrode winding which is to be produced. The conductors 203 and 204 are fixed on the front in a further step (Step 3) with further adhesive strips 209 and 210. The region 211 is bonded over in this case.

Figure 3A:
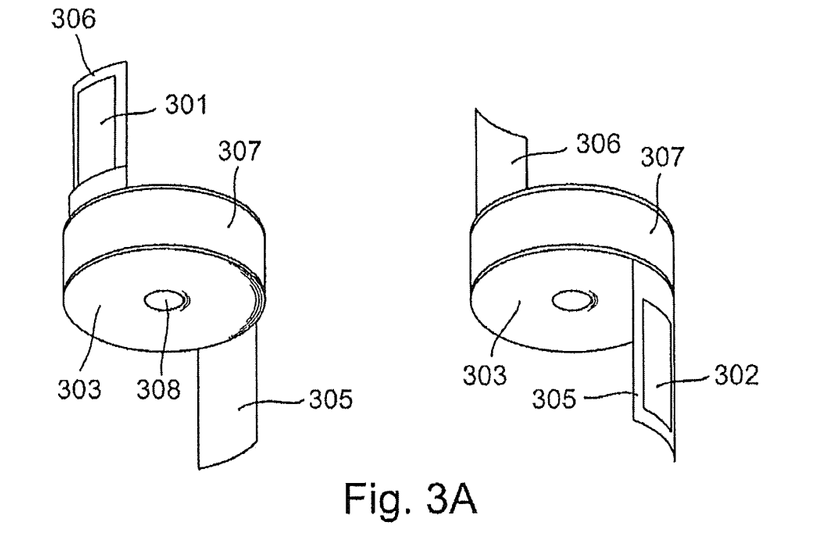
FIGS. 3A and 3B schematically show selected views of windings of the button cell.
Figure 3B:
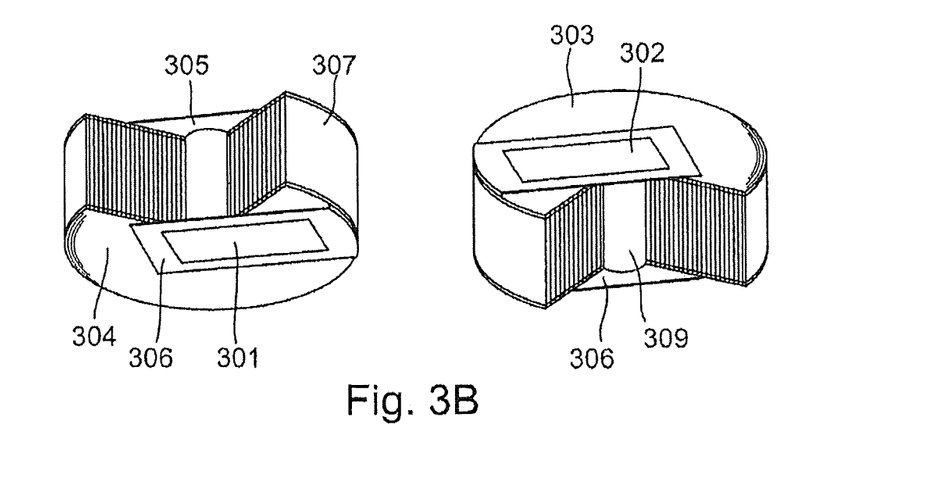

The conductor position in a winding of electrode foils obtained according to FIG. 2A to FIG. 2C can be seen clearly in FIG. 3A. Two different perspective representations of the same winding are shown (left and right). The conductor 301 (which corresponds to the conductor 204 in FIG. 2) and the conductor 302 (which corresponds to the conductor 203 in FIG. 2) are themselves aligned axially at a 90° angle to the winding direction and by folding down by 90° bear flat on the end sides 303 and 304 of the electrode winding. The insulating elements 305 and 306 (which correspond to the insulating tapes 207 and 208 in FIG. 2) prevent direct electrical contact between the conductors 301 and 302 and the end sides 303 and 304 of the electrode winding represented. The outer side of the winding is protected by the insulating film 307. Ideally, the conductors 301 and 302 overlap with the openings of the axial cavity 308 on the end sides so that welding to the button cell housing can be carried out in this region. This can be seen clearly in FIG. 3B, as can the winding core 309 which fills the axial cavity 308.

Figure 4A:
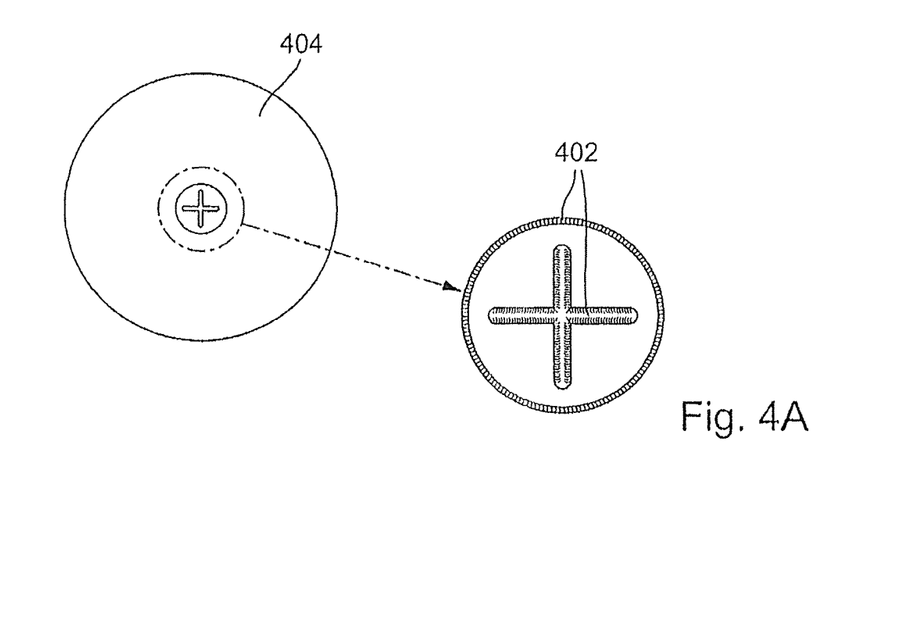
FIGS. 4A and 4B schematically show two different welds.
Figure 4B:
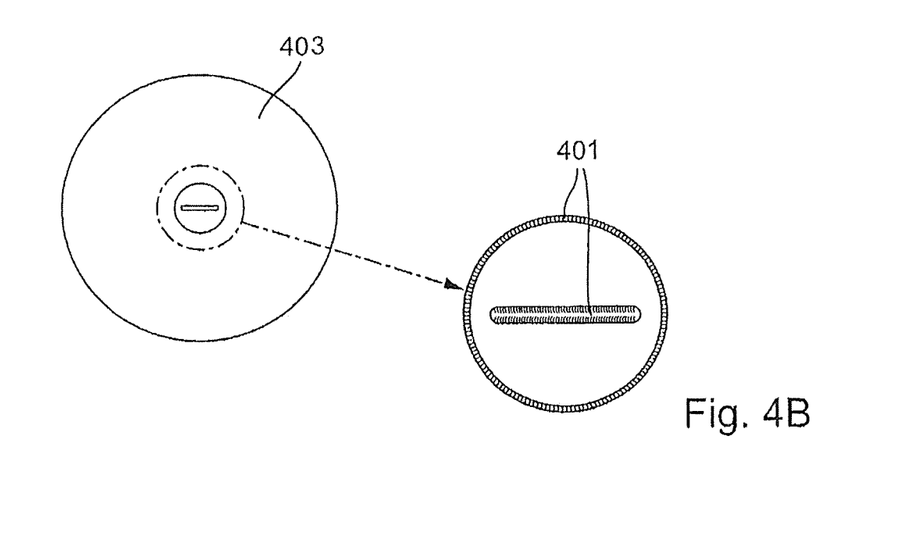

FIGS. 4A and 4B show possible welding variants. For example, it is possible to configure the weld bead as a minus sign 401 or a plus sign 402 (see the respective enlarged representations on the right) so as to indicate the polarity of the respective housing half at the same time. The plus sign 402 is preferably applied on the lower side 404 of a button cell, and the minus sign on the upper side 403.

Figure 5:
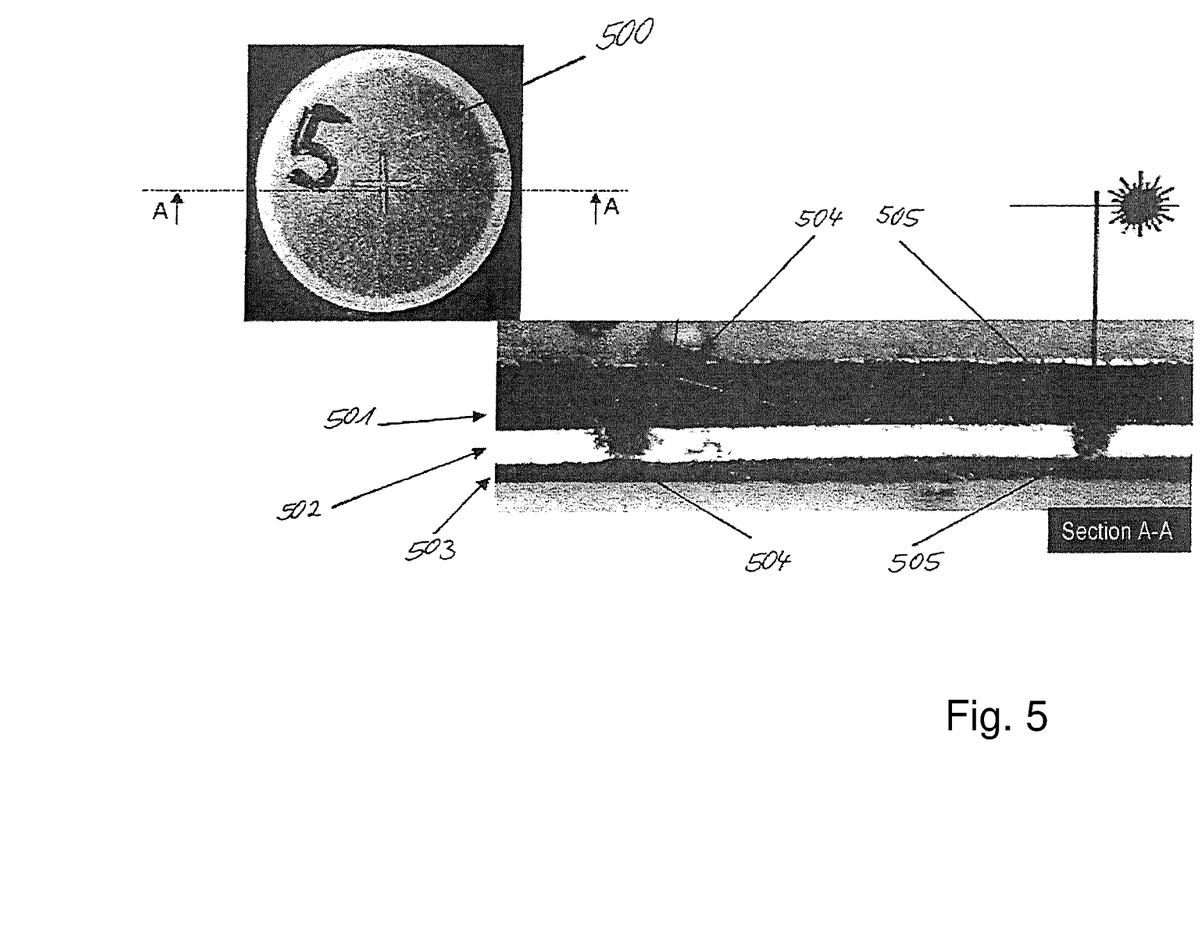
FIG. 5 shows microphotographs of a weld from top and cross-sectional views.

FIG. 5 shows an enlarged representation of a cross section through a housing half 500 of a button cell. The stainless steel cup wall 501, the aluminum conductor 502 bearing flat underneath and an insulating tape 503 of KAPTON film arranged below can be seen. The weld beads 504 and 505, which extend from the outer side of the housing inward as far as the insulating tape 503 of KAPTON film can be seen clearly. The top left image is a plan view of the cutaway plane bottom region of the housing half 500. The housing half 500 and the conductor 502 have been welded using an ytterbium-doped fiber laser of the YLR-400-AC type (manufacturing company IPG Photonics Corporation, USA). The intensity of the laser was in this case adjusted so that the insulating tape 503 was not penetrated.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A button cell, comprising:
   a button cell housing, the button cell housing including:
      a metal cell cup, the metal cell cup having a cell cup plane region connected to a cell cup lateral surface region,
      a metal cell top, the metal cell top having a cell top plane region connected to a cell top lateral surface region, and
      an electrically insulating seal disposed between the cell cup lateral surface region and the cell top lateral surface region;
   an electrode separator assembly disposed inside the button cell housing, the electrode separator assembly including:
      a positive electrode formed from a first portion of a first current collector, the first portion of the first current collector being coated with a first electrode material, the first electrode material being a lithium intercalating electrode material,
      a negative electrode formed from a first portion of a second current collector, the first portion of the second current collector being coated with a second electrode material, and
      a separator disposed between the positive electrode and the negative electrode,
      wherein the positive electrode, the negative electrode, and the separator are wound into the form of a winding, end sides of the winding facing in a direction of the cell cup plane region and the cell top plane region such that layers of the electrode separator assembly are oriented essentially orthogonally to the cell cup plane region and the cell top plane region;
   a second portion of the first current collector directly electrically connected to a first plane region; and
   a second portion of the second current collector directly electrically connected to a second plane region,
   wherein the first plane region is one of the cell cup plane region or the cell top plane region and the second plane region is the other of the cell cup plane region or the cell top plane region,
   wherein the first current collector, including the first portion and the second portion thereof, is a first metallic foil or mesh,
   wherein the second current collector, including the first portion and the second portion thereof, is a second metallic foil or mesh,
   wherein a first direct electrical connection via weld is provided between one of:
      the second portion of the first current collector and the first plane region, and
      the second portion of the second current collector and the second plane region, and
   wherein the button cell is configured as a secondary lithium ion battery.

2. The button cell as claimed in claim 1, the electrode separator assembly further including a winding core, wherein the positive electrode, the negative electrode, and the separator are wound, around the winding core, into the form of the winding.

3. The button cell as claimed in claim 1, wherein second portion of the first current collector is a portion of the first metallic foil or mesh that is not coated with the first electrode material.

4. The button cell as claimed in claim 3, wherein the second portion of the second current collector is a portion of the second metallic foil or mesh that is not coated with the second electrode material.

5. The button cell as claimed in claim 4, wherein the second portion of the first current collector is a rectangular, strip- or band-shaped metal foil, or the second portion of the second current collector is a rectangular, strip- or band-shaped metal foil.

6. The button cell as claimed in claim 4, wherein the second portion of the second current collector is a rectangular, strip- or band-shaped metal foil, and the second portion of the second current collector is a rectangular, strip- or band-shaped metal foil.

7. The button cell as claimed in claim 1, wherein the first metallic film or mesh comprises aluminum, and wherein the second metallic film or mesh comprises nickel or copper.

8. The button cell as claimed in claim 7, wherein each of the first metallic film or mesh and the second metallic film or mesh has a thickness of 1 μm to 100 μm.

9. The button cell as claimed in claim 1, further comprising a first electrical insulator disposed between:
   at least a subsection of the second portion of the first current collector and an end side of the winding adjacent the first plane region, or
   at least a subsection of the second portion of the second current collector and an end side of the winding adjacent the second plane region.

10. The button cell as claimed in claim 9, further comprising a second electrical insulator disposed between:
    at least a subsection of the second portion of the second current collector and an end side of the winding adjacent the second plane region, or
    at least a subsection of the second portion of the second current collector and an end side of the winding adjacent the second plane region.

11. The button cell as claimed in claim 10, wherein each of the first electrical insulator and the second electrical insulator is an adhesive tape.

12. The button cell as claimed in claim 9, wherein the first electrical insulator is an adhesive tape.

13. The button cell as claimed in claim 1, wherein the electrode winding is cylindrical,
    wherein the second portion of the first current collector forms a rectangular layer lying between an end side of the electrode winding adjacent the first plane region.

14. The button cell as claimed in claim 1, wherein the electrode winding is cylindrical,
    wherein the second portion of the second current collector forms a rectangular layer lying between an end side of the electrode winding adjacent the second plane region, and
    wherein the rectangular layer has a length that is less than a diameter of the second end side of the electrode winding.

15. The button cell as claimed in claim 1, wherein the second portion of the first current collector includes a first region connected to the first portion of the first current collector and a second region directly electrically connected to the first plane region, wherein the first region and the second region are aligned at a 90° angle to one another.

16. The button cell as claimed in claim 1, wherein the second portion of the second current collector includes a first region connected to the first portion of the second current collector and a second region directly electrically connected to the first plane region, wherein the first region and the second region are aligned at a 90° angle to one another.

17. The button cell as claimed in claim 1, wherein the separator includes multiple separator layers, and
   wherein the electrode separator assembly has one of the following layer sequences:
      negative electrode/separator layer/positive electrode/separator layer, or
      positive electrode/separator layer/negative electrode/separator layer.

18. The button cell as claimed in claim 1, wherein the second portion of the first current collector and the first plane region form a sequence of parallel, planar layers in direct contact with one another.

19. The button cell as claimed in claim 18, wherein the second portion of the second current collector and the second plane region form a sequence of parallel, planar layers in direct contact with one another.

20. The button cell as claimed in claim 1, wherein the second portion of the second current collector and the second plane region form a sequence of parallel, planar layers in direct contact with one another.

21. The button cell as claimed in claim 1, wherein the first direct electrical connection via weld is provided between the second portion of the first current collector and the first plane region, and wherein a second direct electrical connection via weld is provided between the second portion of the second current collector and the second plane region.

22. The button cell as claimed in claim 21, wherein the first direct electrical connection via weld is provided by at least one first weld bead and/or weld spot that originates from an outer side of the button cell housing, and wherein the second direct electrical connection via weld is provided by at least one second weld bead and/or weld spot that originates from an outer side of the button cell housing.

23. The button cell as claimed in claim 22, wherein the at least one first weld bead and/or weld spot is at least one first laser weld bead and/or laser weld spot, and wherein the at least one second weld bead and/or weld spot is at least one second laser weld bead and/or laser weld spot.

24. The button cell as claimed in claim 1, wherein the first direct electrical connection via weld is provided by at least one weld bead and/or weld spot that originates from an outer side of the button cell housing.

25. The button cell as claimed in claim 24, wherein the at least one weld bead and/or weld spot is at least one laser weld bead and/or laser weld spot.

* * * * *